United States Patent [19]
Ohkubo et al.

[11] Patent Number: 6,131,035
[45] Date of Patent: *Oct. 10, 2000

[54] COMMUNICATION CHANNEL ASSIGNING SYSTEM

[75] Inventors: Kazuko Ohkubo; Masahiko Yahagi, both of Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/144,996

[22] Filed: Sep. 1, 1998

[30] Foreign Application Priority Data

Sep. 2, 1997 [JP] Japan .................................. 9-237109

[51] Int. Cl.$^7$ .................................................. H04B 15/00
[52] U.S. Cl. .......................... 455/450; 455/423; 455/436
[58] Field of Search .................................... 455/522, 450, 455/453, 63, 62, 436, 69; 370/355, 342, 320, 441, 478

[56] References Cited

U.S. PATENT DOCUMENTS 5,832,368  11/1998  Nakano et al. ............................ 455/62

FOREIGN PATENT DOCUMENTS

| | | |
|---|---|---|
| 7-030517 | 1/1995 | Japan . |
| 7-143546 | 6/1995 | Japan . |
| 7-170243 | 7/1995 | Japan . |
| 7-297753 | 11/1995 | Japan . |
| 9-8769 | 1/1997 | Japan . |
| 9-247079 | 9/1997 | Japan . |
| 9-327072 | 12/1997 | Japan . |

*Primary Examiner*—Curtis A. Kuntz
*Assistant Examiner*—Melur Ramakrishnaiah
*Attorney, Agent, or Firm*—Foley & Lardnder

[57] ABSTRACT

A communication channel assigning system is disclosed, that comprises a mobile communication system having a plurality of radio base stations disposed in a plurality of radio zones, a plurality of mobile stations for communicating with the base stations using communication channels, and a radio base station controlling unit for controlling the radio base stations, a transmitting means for transmitting data corresponding to a code division multiple-access radio modulation system, a means for assigning a communication channel to the data transmitted by the transmitting means, and a means for using communication channels with a plurality of bandwidth in the same frequency band.

20 Claims, 4 Drawing Sheets

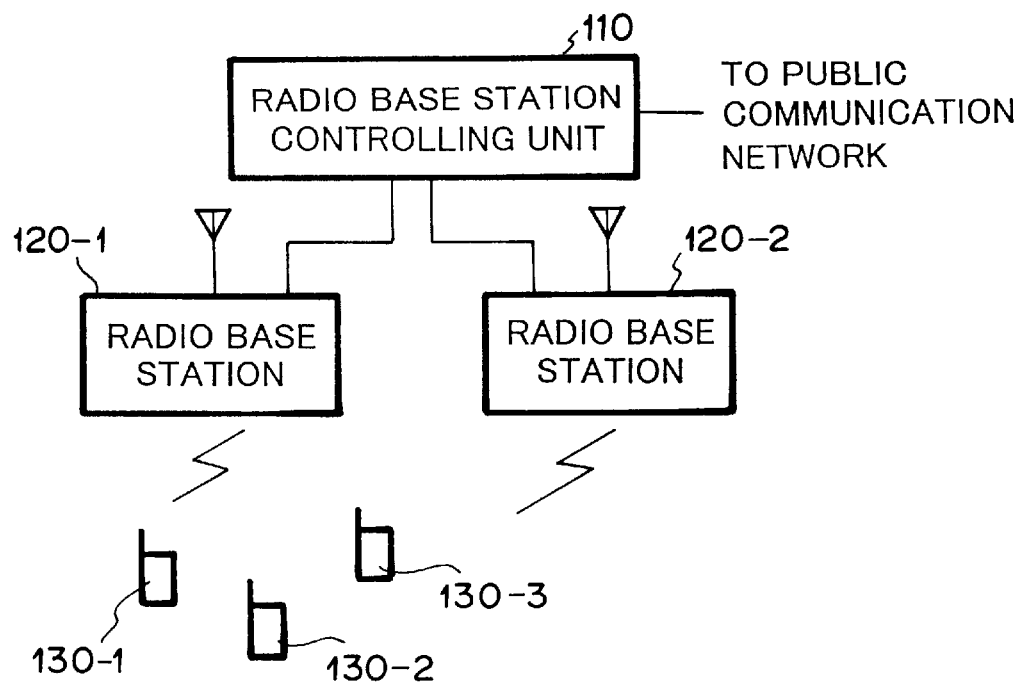
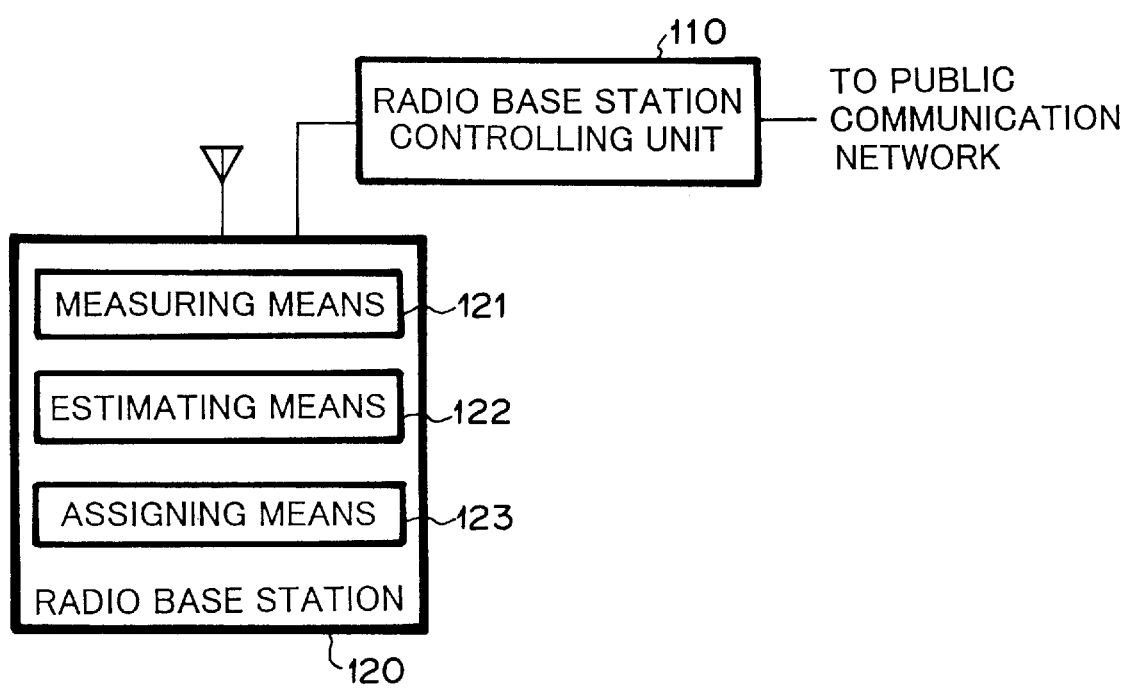

BEFORE CALL IS HANDED OVER

AFTER CALL IS HANDED OVER

COMMUNICATION CHANNEL ASSIGNING SYSTEM

BACKGROUND OF THE INVENTION

1. Field of the Invention

The present invention relates to a communication channel assigning system corresponding to DS (Direct Sequence)-CDMA (Code Division Multiple Access) radio modulation method and FH (Frequency Hopping)-CDMA radio modulation method for use with a mobile communication system such as a portable telephone system.

2. Description of the Related Art

In recent years, in mobile communication systems, as well as audio information, data communication system with a higher bit rate than audio information has been required for communications. As a modulation system that satisfies such a requirement, a CDMA radio communication modulation system is known.

In the conventional CDMA radio modulation system, each of various frequency bands (for example, a 1-MHz band as a narrow band, a 5-MHz band as a intermediate band, and a 20-MHz band as a wide band) is assigned a predetermined number of communication channels. The number of communication channels that can be used at a time in each band (namely, the interference power amount of each band) is fixed to a predetermined value.

Thus, when the number of calls that take place in one frequency band exceeds a predetermined value, even if another frequency band has free channels, the excessive calls cannot be assigned to the free channels. Thus, in the conventional mobile communication system, frequency bands cannot be sufficiently used. In other words, the conventional mobile communication system has a large division loss.

SUMMARY OF THE INVENTION

An object of the present invention is to provide a communication channel assigning system that can effectively use a particular frequency band.

The present invention is a communication channel assigning system, comprising a mobile communication system having a plurality of radio base stations disposed in a plurality of radio zones, a plurality of mobile stations for communicating with the base stations using communication channels, and a radio base station controlling unit for controlling the radio base stations, a transmitting means for transmitting data corresponding to a code division multiple-access radio modulation system, a means for assigning a communication channel to the data transmitted by the transmitting means, and a means for using communication channels with a plurality of bandwidth in the same frequency band.

The communication channel assigning system of the present invention further comprises a measuring means for measuring the interference power amount of each frequency band, an estimating means for estimating the transmission power amount necessary for the type of a service of a newly generated call, and an assigning means for determining a frequency band with the minimum division loss corresponding to the interference power amount of each frequency band measured by the measuring means and the transmission power amount estimated by the estimating means and assigns the newly generated call to the determined frequency band.

The communication channel assigning system of the present invention further comprises a measuring means for measuring the interference power amount of each frequency band upon occurrence of a new call, an estimating means for estimating the transmission power amount necessary for the type of the service of the newly generated call, an assigning means for simulating the interference power amount of each frequency band in the case that each existing call is handed over to another frequency band, obtaining the resultant simulation information, handing over each existing call corresponding to the interference power amount of each frequency band measured by the measuring means, the transmission power amount estimated by the estimating means, and the simulation information, determining the frequency band with the minimum division loss for the newly generated call, and assigning the newly generated call to the determined frequency band.

Each of the radio base stations has the measuring means, the estimating means, and the assigning means.

Each of the radio base stations has the measuring means and the estimating means. The radio base station controlling unit has the assigning means. Each of the radio base stations has an estimated result informing means for informing the radio base station controlling unit of the power amount estimated by the estimating means.

Each of the radio base stations has the measuring means. The radio base station controlling unit has the estimating means and the assigning means. Each of the radio base stations has an estimated result informing means for informing the radio base station controlling unit of the power amount estimated by the estimating means.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is a block diagram showing a mobile communication system employing a communication channel assigning system according to an embodiment of the present invention;

FIG. 2 is a block diagram for explaining the communication channel assigning system according to a first embodiment of the present invention;

DESCRIPTION OF PREFERRED EMBODIMENTS

Figure 3:
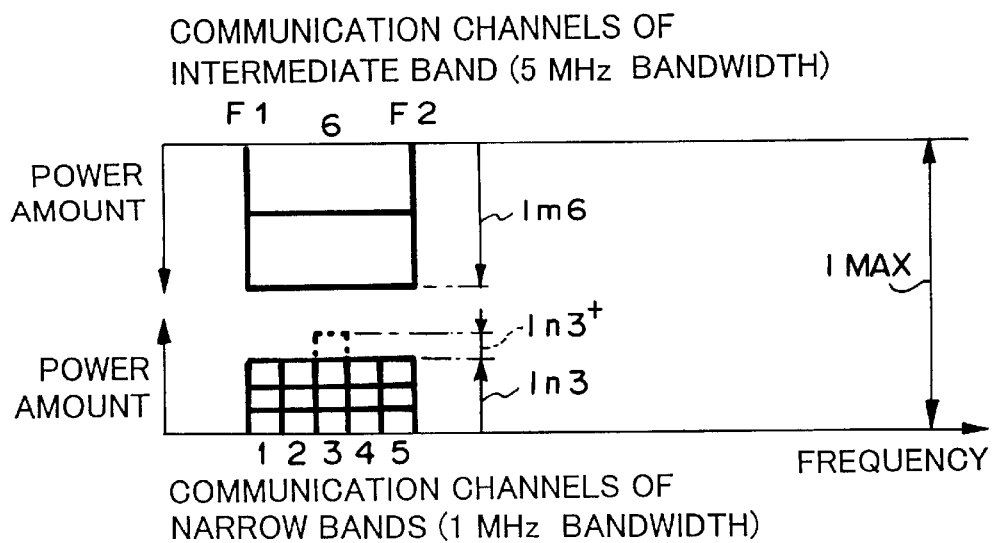
FIG. 3 is a schematic diagram for explaining the operation of the communication channel assigning system according to the first embodiment of the present invention.

Next, with reference to the accompanying drawings, a communication channel assigning system according to an embodiment of the present invention will be described.

FIG. 1 is a schematic diagram showing an example of the structure of a mobile communication system employing a communication channel assigning system according to an embodiment of the present invention. Referring to FIG. 1, the mobile communication system comprises a radio base station controlling unit 110, a plurality of radio base stations 120 (120-1 and 120-2), and a plurality of mobile stations 130 (130-1, 130-2, and 130-3). It should be noted that the number of radio base stations 120 and the number of mobile stations 130 are not limited to those shown in FIG. 1. Each radio base station 120 is disposed in each known radio zone. Each radio base station 120 communicates with mobile stations in the zone of the radio base station 120 using respective communication channels.

In the communication channel assigning system according to the present invention, communications channels having a plurality of frequency bandwidth are used as the same frequency band.

FIRST EMBODIMENT

FIG. 2 is a block diagram for explaining a communication channel assigning system according to a first embodiment of the present invention. FIG. 2 shows the structure of the radio base station 120 shown in FIG. 1.

Referring to FIG. 2, the radio base station 120 comprises a measuring means or unit 121, an estimating means or unit 122, and an assigning means unit 123. The measuring means 121 measures the interference power amount of each frequency band. The estimating means 122 estimates the transmission power amount required for the type of the service of a newly generated call. The assigning means 123 determines a frequency band with the minimum division loss corresponding to the interference power amount of each frequency band measured by the measuring means 121 and the transmission power amount estimated by the estimating means 122 and assigns the newly generated call to the determined frequency band.

Next, the operation of the communication channel assigning system will be described.

FIG. 3 is a schematic diagram showing the used state of communication channels upon occurrence of a new call. In FIG. 3, the horizontal axis and the vertical axis represent the frequency and power amount, respectively.

In FIG. 3, a frequency band F1-F2 (5 MHz bandwidth) is used. The frequency band F1-F2 is divided into five frequency bands 1 to 5 (1 MHz bandwidth). In the frequency band F1-F2, communication channels of the narrow band (1 MHz bandwidth) correspond to the frequency bands 1 to 5. In each of the frequency bands 1 to 5, three communication channels of the narrow band are used. The communication channel of the intermediate band (5 MHz bandwidth) corresponds to all the region of the frequency bands 1 to 5. Hereinafter, all the region of the frequency bands 1 to 5 is referred to as a frequency band 6. In the frequency band 6, two communication channels of the intermediate band are used.

As shown in FIGS. 2 and 3, when a new call of the narrow band is generated, the measuring means 121 of the radio base station 120 measures the interference power amount of each frequency band. For example, an interference power amount I3 of the frequency band 3 is obtained by adding an interference power amount In3 of a communication channel of the frequency band 3 of the narrow band and an interference power amount Im6 of a communication channel of the frequency band 6 of the intermediate band as expressed by the following formula (1).

$$I3 = In3 + Im6 \tag{1}$$

The estimating means 122 estimates the transmission power amount required for the type of the service of the generated call.

The assigning means 123 determines a frequency band with the minimum division loss corresponding to the interference power amount measured by the measuring means 121 and the transmission power amount estimated by the estimating means 122 and assigns the newly generated call to the determined frequency band.

For example, the assigning means 123 obtains a temporary interference power amount of a communication channel in the case that the generated call is assigned to the frequency band 3. In other words, assuming that the estimated result is $In3^+$, the temporary interference power amount of the frequency band 3 to which the generated call is assigned becomes $I3+In3^+$.

The temporary interference power amount $I3+In3^+$ is compared with the maximum interference power amount IMAX of the system. When the following formula (2) is satisfied, the assigning means 123 determines that the generated call can be assigned to the frequency band 3 and assigns the generated call to the frequency band 3.

$$I3 + In3^+ < IMAX \tag{2}$$

It should be noted that the interference power amounts In3 and In6 may be based on SIR (Signal Interference Ratio) of each frequency bandwidth.

In the first embodiment, the case that a generated call is assigned to a channel of the narrow bandwidth (1 MHz) or a channel of the intermediate bandwidth (5 MHz) was described. Likewise, the present invention can be applied to the case that a call is assigned to a channel of the wide bandwidth (20 MHz) as well as a channel of the narrow bandwidth (1 MHz) or a channel of the intermediate bandwidth (5 MHz).

SECOND EMBODIMENT

Figure 4:
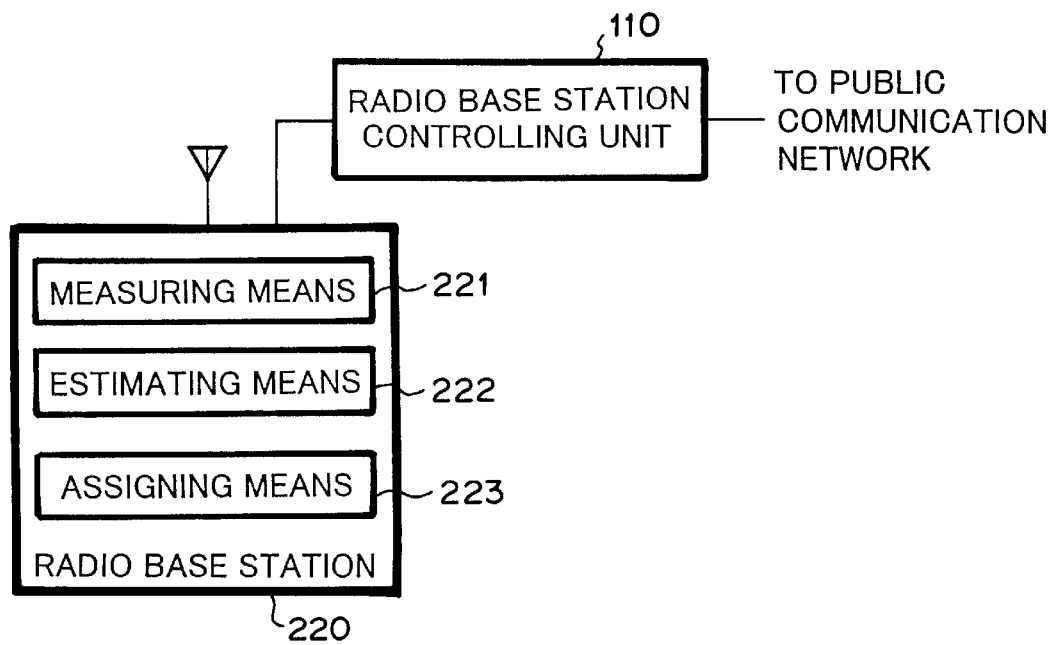
FIG. 4 is a block diagram for explaining a communication channel assigning system according to a second embodiment of the present invention.

FIG. 4 is a block diagram for explaining a communication channel assigning system according to a second embodiment of the present invention. FIG. 4 shows the structure of a radio base station 220. The second embodiment features the radio base station 220 that is disposed instead of the radio base station shown in FIG. 1.

Referring to FIG. 4, the radio base station 220 comprises a measuring means 221, an estimating means 222, and an assigning means 223. The measuring means 221 measures the interference power amount of each frequency band for a newly generated call. The estimating means 222 estimates the transmission power amount necessary for the type of the service of the newly generated call. The assigning means 223 simulates the interference power amount of each frequency band in the case that each existing call is handed over to another frequency band and obtains the resultant simulation information, hands over each existing call corresponding to the interference power amount of each frequency band measured by the measuring means 221, the transmission power amount estimated by the estimating means 222, and the simulation information, determines the frequency band with the minimum division loss for the newly generated call, and assigns the newly generated call to the determined frequency band.

Next, the operation of the mobile communication system will be described.

Figure 5A:
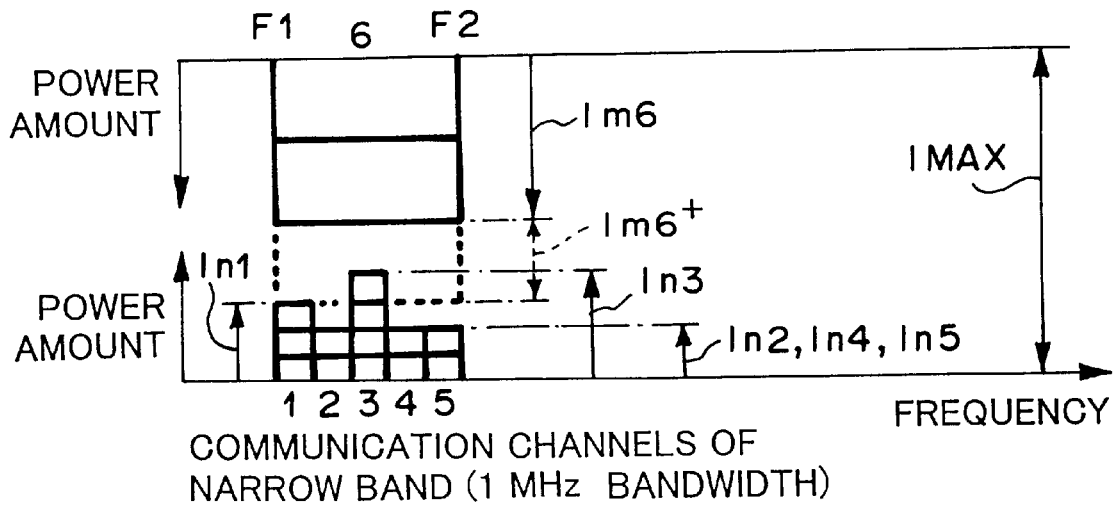
FIGS. 5A and 5B are schematic diagrams for explaining the operation of the communication channel assigning system of the present invention.

FIG. 5A is a schematic diagram showing the used state of communication channels upon occurrence of a new call. In FIG. 5A, the horizontal axis and vertical axis are frequency and power amount, respectively.

Referring to FIG. 5A, a frequency band F1-F2 (5 MHz bandwidth) is divided into five frequency bands 1 to 5 (1 MHz bandwidth). In the frequency band F1-F2, communication channels of the narrow band (1 MHz bandwidth) correspond to frequency bands 1 to 5. In the frequency band 1, three communication channels of the narrow band are used. In each of the frequency bands 2, 4, and 5, two communication channels of the narrow band are used. In the frequency band 3, four communication channels of the narrow band are used. Communication channels of the intermediate band (5 MHz bandwidth) correspond to a frequency band 6 that is all the region of the frequency bands 1 to 5. In the frequency band 6, two communication channels of the intermediate band are used.

Figure 5B:
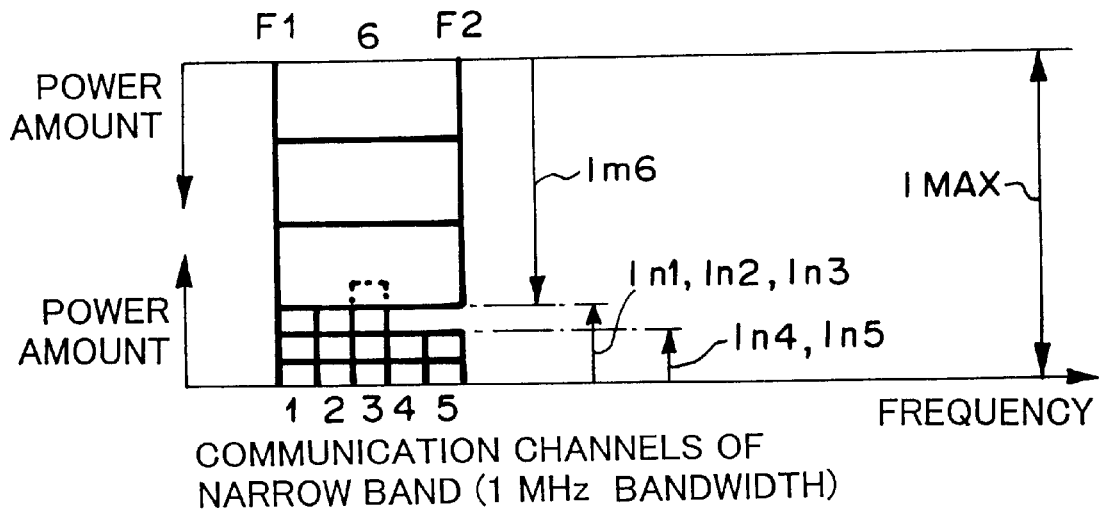

As shown in FIGS. 4, 5A, and 5B, when a call of the intermediate band is generated, the measuring means 221 of the radio base station 220 measures the interference power amount of each of the frequency bands 1 to 5. The interference power amounts I1 to I5 of the frequency bands 1 to 5 are obtained by adding the interference power amounts In1 to In5 of communication channels of the frequency bands 1 to 5 of the narrow band and the interference power amount Im6 of a communication channel of the frequency band 6 of the intermediate band as expressed by Formula (3).

$$I1 = In1 + Im6$$
$$I2 = In2 + Im6$$
$$I3 = In3 + Im6$$
$$I4 = In4 + Im6$$
$$I5 = In5 + Im6 \quad (3)$$

The estimating means 22 estimates the power amount necessary for the type of the service of the newly generated call.

The assigning means 223 hands over each existing call corresponding to the interference power amount of each frequency band measured by the measuring means 221, the transmission power amount estimated by the estimating means 222, and simulation information of which each existing call is handed over from an original frequency band to another frequency band, obtains handover source and destination of each existing call and the temporary interference power amount of a communication channel of each frequency band to which the newly generated call is assigned, and assigns the newly generated call to a frequency band with less than the maximum interference power amount IMAX.

Assuming that the estimated result is $Im6^+$, the assigning means 223 obtains the temporary interference power amounts $I1+Im6^+$, $I2+Im6^+$, $I3+Im6^+$, $I4+Im6^+$, and $I5+Im6^+$ of the frequency bands 1 to 5 to which the new generated call is temporarily assigned in the case that each existing call is not handed over.

The temporary interference power amounts are compared with the maximum interference power amount IMAX of the system. The compared results are expressed by Formula (4).

$$I1+Im6^+ < IMAX$$
$$I2+Im6^+ < IMAX$$
$$I3+Im6^+ > IMAX$$
$$I4+Im6^+ < IMAX$$
$$I5+Im6^+ < IMAX \quad (4)$$

In Formula (4), the expression with respect to the frequency band 3 is not satisfied. Since the newly generated call uses the intermediate band, when Formula (4) is not satisfied for one of the frequency bands 1 to 5, the newly generated call cannot be assigned.

Thus, the assigning means 223 performs a simulation for handing over each existing call from the original frequency band to another frequency band and obtains simulation information of which one existing call in the frequency band 3 is temporarily handed over to the frequency band 2. When the temporary interference power amounts of the frequency bands corresponding to the simulation information are compared with the maximum interference power amount IMAX of the system, the results expressed by Formula (5) are obtained.

$$I1+Im6^+ < IMAX$$
$$I2+Im6^+ < IMAX$$
$$I3+Im6^+ < IMAX$$
$$I4+Im6^+ < IMAX$$
$$I5+Im6^+ < IMAX \quad (5)$$

measuring means 321, an estimating means 322, and an estimated result informing means 323. The estimated result informing means 323 informs the radio base station controlling unit 310 of a transmission power amount estimated by the estimating means 322. The radio base station controlling unit 310 comprises an assigning means 311.

The structures and operations of the measuring means 321, the estimating means 322, and the assigning means 311 according to the third embodiment are the same as those of the measuring means 121, the estimating means 122, and the assigning means 123 according to the first embodiment. Alternatively, the structures and operations of the measuring means 321, the estimating means 322, and the assigning means 311 according to the third embodiment are the same as those of the measuring means 221, the estimating means 222, and the assigning means 223 according to the second embodiment. According to the structure of the third embodiment shown in FIG. 6, since only the radio base station controlling unit 310 assigns newly generated calls to relevant frequency bands corresponding to estimated results of a plurality of base stations 320, interference of frequencies among a plurality of cells can be suppressed.

FOURTH EMBODIMENT

Figure 7:
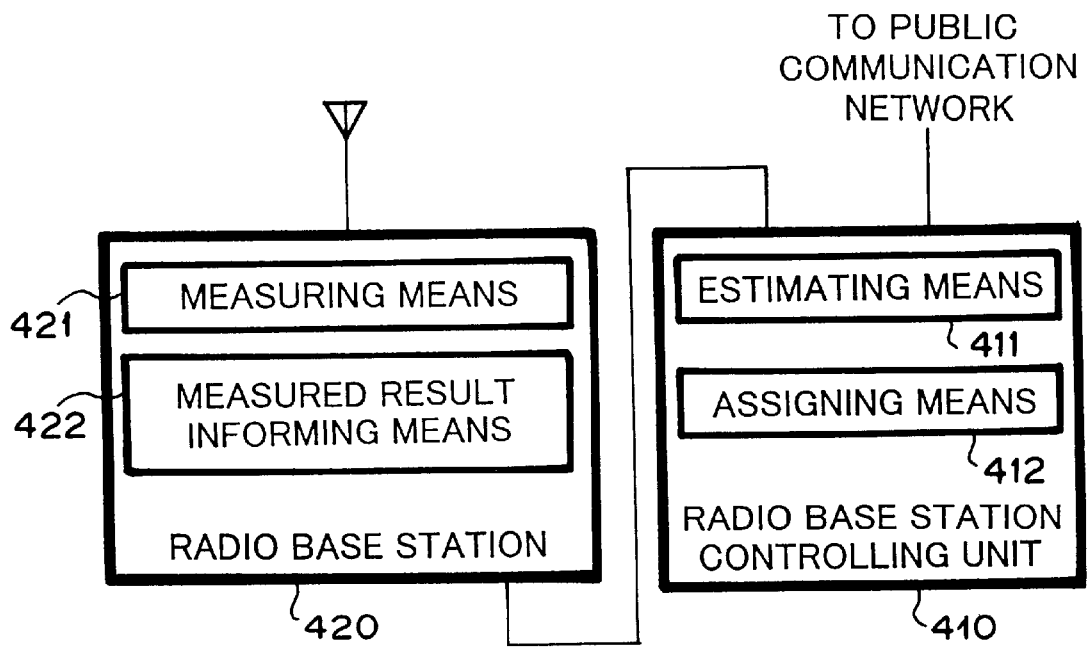
FIG. 7 is a block diagram for explaining a communication channel assigning system according to a fourth embodiment of the present invention.

FIG. 7 is a block diagram for explaining a communication channel assigning system according to a forth embodiment of the present invention. FIG. 7 shows principal portion of a mobile communication system for the communication channel assigning system. The fourth embodiment features a radio base station 420 and a radio bases station 410 disposed instead of the radio base station 120 and the radio base station controlling unit 110 shown in FIG. 1.

Referring to FIG. 7, the radio base station 420 comprises a measuring means 421 and a measured result informing means 422. The measured result informing means 422 informs the radio base station controlling unit 410 of each interference power amount measured by the measuring means 421. The radio base station controlling unit 410 comprises an estimating means 411 and an assigning means 412.

The structures and operations of the measuring means 421, the estimating means 411, and the assigning means 412 according to the fourth embodiment are the same as those of the measuring means 121, the estimating means 122, and the assigning means 123 according to the first embodiment. Alternatively, the structures and operations of the measuring means 421, the estimating means 411, and the assigning means 412 according to the fourth embodiment are the same as those of the measuring means 221, the estimating means 222, and the assigning means 223 according to the second embodiment.

In the structure shown in FIG. 7, the radio base station controlling unit 410 obtains the interference power amounts measured by the radio base station 420 of each area cell. The radio base station controlling unit 410 estimates proper frequency bands and assigns newly generated calls to the estimated frequency bands. Thus, in the area zone of the controlling unit 410, the interference of frequencies can be suppressed. In addition, the communication quality and QOS(Quality of service) can be improved.

In the communication channel assigning system according to the present invention, communication channels of different frequency bands can be effectively used.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

Thus, since Formula (6) is satisfied for all the frequency bands, the assigning means 224 determines that the newly generated call can be assigned to the frequency band 6 in the condition that one existing call in the frequency band 3 is handed over to the frequency band 2. Thus, the assigning means 224 hands over one existing call in the frequency band 3 to the frequency band 2 and assigns the newly generated call to the frequency band 6 as shown in FIG. 5B.

In the example shown in FIG. 5A, it is clear that one existing call in the frequency band 3 may be handed over to the frequency band 4 or 5.

In the first and second embodiments, the case that a generated call is assigned to a channel of the narrow bandwidth (1 MHz) or a channel of the intermediate bandwidth (5 MHz) was described. Likewise, the present invention can be applied to the case that a call is assigned to a channel of the wide bandwidth (20 MHz) as well as a channel of the narrow bandwidth (1 MHz) or a channel of the intermediate bandwidth (5 MHz).

THIRD EMBODIMENT

Figure 6:
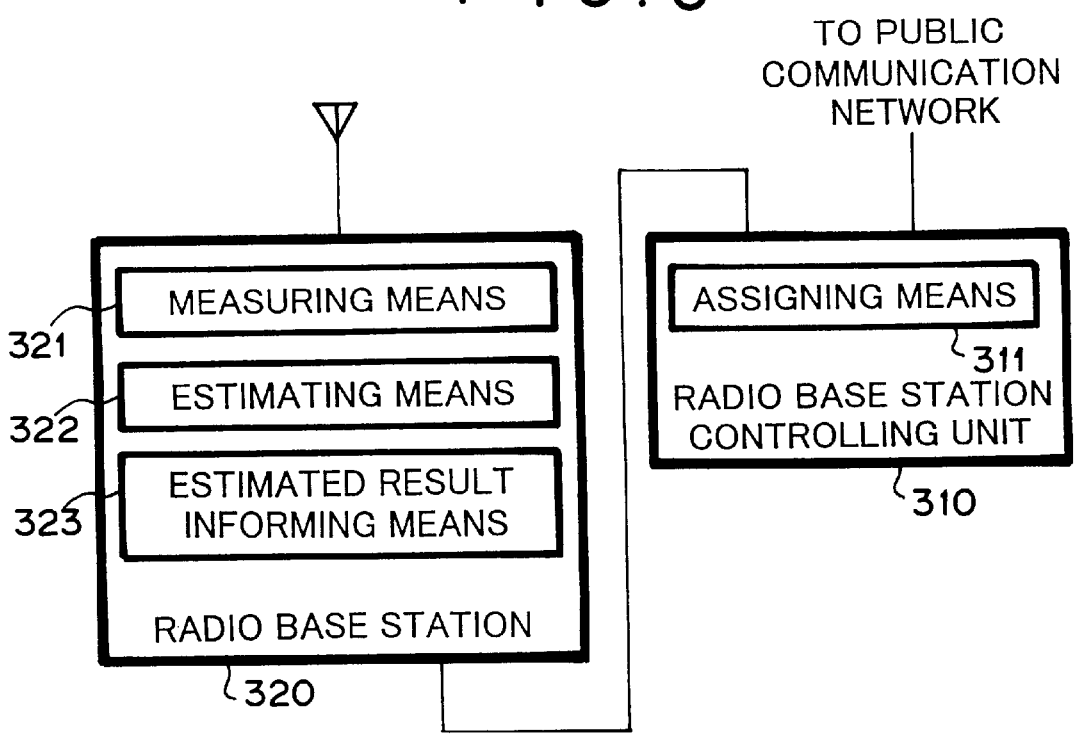
FIG. 6 is a block diagram for explaining a communication channel assigning system according to a third embodiment of the present invention.

FIG. 6 is a block diagram for explaining a communication channel assigning system according to a third embodiment of the present invention. FIG. 6 shows principal portions of a mobile communication system for the communication channel assigning system. The third embodiment features a radio base station 320 and a radio base station controlling unit 310 disposed instead of the radio base station 120 and the radio base station controlling unit 110 shown in FIG. 1, respectively.

Referring to FIG. 6, the radio base station 320 comprises a

What is claimed is:

1. A communication channel assigning system, comprising:
   a plurality of radio base stations disposed in a plurality of radio zones;
   a plurality of mobile stations for communicating with the base stations using communication channels;
   a radio base station controlling unit for controlling said radio base stations;
   a transmitting unit and a receiving unit for transmitting data and receiving data from/to said radio base stations in said mobile stations corresponding to a code division multiple-access radio modulation system;
   an assigning unit for assigning a communication channel to the data transmitted by said transmitting unit and for using a plurality of communication channel layers of communication channels with a plurality of bandwidth in the same frequency band;
   a measuring unit for measuring the interference power amount of each frequency band;
   an estimating unit for estimating the transmission power amount necessary for the needed service type when a call newly generates for a service; and
   a determining unit for determining a frequency band with the minimum division loss corresponding to the interference power amount of each frequency band measured by said measuring unit and the transmission power amount estimated by said estimating unit, and assigns the newly generated call to the determined frequency band.

2. The communication channel assigning system as set forth in claim 1, wherein
   each of the radio base stations has said measuring unit, said estimating unit, and said determining unit.

3. The communication channel assigning system as set forth in claim 2,
   wherein a plurality of types of frequency bandwidth are redundantly used.

4. The communication channel assigning system as set forth in claim 1, wherein
   each of the radio base stations has said measuring unit and said estimating unit, wherein
      the radio base station controlling unit has said determining unit, and wherein
         each of the radio base stations has an estimated result informing unit for informing the radio base station controlling unit of the power amount estimated by said estimating unit.

5. The communication channel assigning system as set forth in claim 4,
   wherein a plurality of types of frequency bandwidth are redundantly used.

6. The communication channel assigning system as set forth in claim 1, wherein
   each of the radio base stations has said measuring unit, wherein
      the radio base station controlling unit has said estimating unit and said determining unit, and wherein
         each of the radio base stations has an estimated result informing unit for informing the radio base station controlling unit of the power amount estimated by said estimating unit.

7. The communication channel assigning system as set forth in claim 2,
   wherein a plurality of types of frequency bandwidth are redundantly used.

8. The communication channel assigning system as set forth in claim 1, further comprising:
   a simulating/assigning unit for simulating the interference power amount of each frequency band when the mobile station performs a handover and outputs simulating information, wherein said assigning unit performs allowance of the handover as based on the simulating information, the interference power, and the transmitted power.

9. A communication channel assigning system for a mobile communication system, comprising:
   a plurality of radio base stations disposed in a plurality of radio zones,
   a plurality of mobile stations for communicating with the base stations using communication channels,
   a radio base station controlling unit for controlling the radio base stations;
   a transmitting unit for transmitting data corresponding to a code division multiple-access radio modulation system;
   an assigning unit for assigning a communication channel to the data transmitted by said transmitting unit;
   a communication unit for using communication channels with a plurality of bandwidth in the same frequency band;
   a measuring unit for measuring the interference power amount of each frequency band, and wherein
      the measuring unit measures the interference power amount of each frequency band upon occurrence of a new call; and further comprising:
         an estimating unit for estimating the transmission power amount necessary for the type of the service of the newly generated call;
         a simulating/assigning unit for simulating the interference power amount of each frequency band, wherein
            each existing call is handed over to another frequency band,
            obtaining the resultant simulation information,
            handing over each existing call corresponding to the interference power amount of each frequency band measured by said measuring unit, the transmission power amount estimated by said estimating unit, and the simulation information,
            determining the frequency band with the minimum division loss for the newly generated call, and
            assigning the newly generated call to the determined frequency band.

10. The communication channel assigning system as set forth in claim 9, wherein
   each of the radio base stations has said measuring unit, said estimating unit, and said determining unit.

11. The communication channel assigning system as set forth in claim 9, wherein
   each of the radio base stations has said measuring unit and said estimating unit, wherein
      the radio base station controlling unit has said determining unit, and wherein
         each of the radio base stations has an estimated result informing unit for informing the radio base station controlling unit of the power amount estimated by said estimating unit.

12. The communication channel assigning system as set forth in claim 9, wherein
   each of the radio base stations has said measuring unit, wherein
      the radio base station controlling unit has said estimating unit and said determining unit, and wherein
      each of the radio base stations has an estimated result informing unit for informing the radio base station controlling unit of the power amount estimated by said estimating unit.

13. The communication channel assigning system as set forth in claim 9,
   wherein a plurality of types of frequency bandwidth are redundantly used.

14. A method for assigning a communication channel, comprising the steps of:
   communicating, using communication channels, between a plurality of mobile stations and a plurality of radio base stations disposed in a plurality of radio zones,
   controlling the radio base stations via a radio base station controlling unit;
   transmitting data corresponding to a code division multiple-access radio modulation system via a transmitting unit;
   assigning a communication channel, via an assigning unit, to the data transmitted by said transmitting unit;
   utilizing communication channels with a plurality of bandwidth in the same frequency band via a communication unit;
   measuring the interference power amount of each frequency band, via a measuring unit, so as to measure the interference power amount of each frequency band upon occurrence of a new call;
   estimating the transmission power amount necessary, via an estimating unit, for the type of the service of the newly generated call;
   simulating, via a simulating/assigning unit, the interference power amount of each frequency band, in a case when each existing call is handed over to another frequency band;
   obtaining the resultant simulation information;
   handing over each existing call corresponding to
      the interference power amount of each frequency band that is measured by said measuring unit,
      the transmission power amount estimated by said estimating unit, and
      the simulation information;
   determining the frequency band with the minimum division loss for the newly generated call, and
   assigning the newly generated call to the determined frequency band.

15. The method as recited in claim 14, wherein
   each of the radio base stations has said measuring unit, said estimating unit, and said determining unit.

16. The method as recited in claim 14, wherein
   each of the radio base stations has said measuring unit and said estimating unit, wherein
      the radio base station controlling unit has said determining unit, and further comprising the step of
      informing the radio base station controlling unit, via an estimated result informing unit in each of the radio base stations, of the power amount estimated by said estimating unit.

17. The method as recited in claim 14, wherein
   each of the radio base stations has said measuring unit, wherein
      the radio base station controlling unit has said estimating unit and said determining unit, and wherein
         each of the radio base stations has an estimated result informing unit, and further comprising the step of informing the radio base station controlling unit of the power amount estimated by said estimating unit.

18. The method as recited in claim 14, further comprising the step of redundantly utilizing a plurality of types of frequency bandwidth.

19. A method for assigning a communication channel, comprising the steps of:

having a plurality of radio base stations disposed in a plurality of radio zones;

communicating between a plurality of mobile stations and the base stations utilizing communication channels;

controlling said radio base stations by utilizing a radio base station controlling unit;

transmitting data and receiving data from/to said radio base stations in said mobile stations corresponding to a code division multiple-access radio modulation system, by utilizing a transmitting unit and a receiving unit;

assigning a communication channel to the data transmitted by said transmitting unit by utilizing an assigning unit utilizing a plurality of communication channel layers of communication channels with a plurality of bandwidth in the same frequency band by utilizing the assigning unit;

measuring the interference power amount of each frequency band by utilizing a measuring unit;

estimating the transmission power amount necessary for the needed service type when a call newly generates for a service by utilizing an estimating unit; and determining a frequency band with the minimum division loss corresponding to the interference power amount of each frequency band measured by said measuring unit and the transmission power amount estimated by said estimating unit by utilizing a determining unit, and for assigning the newly generated call to the determined frequency band.

20. A method for assigning a communication channel, comprising the steps of:

having a plurality of radio base stations disposed in a plurality of radio zones;

communicating between a plurality of mobile stations and the base stations utilizing communication channels;

controlling said radio base stations;

transmitting data and receiving data from/to said radio base stations in said mobile stations corresponding to a code division multiple-access radio modulation system;

assigning a communication channel to the data transmitted, utilizing a plurality of communication channel layers of communication channels with a plurality of bandwidth in the same frequency band;

measuring the interference power amount of each frequency band;

estimating the transmission power amount necessary for the needed service type when a call newly generates for a service;

determining a frequency band with the minimum division loss corresponding to the interference power amount of each frequency band measured and the transmission power amount estimated, and assigning the newly generated call to the determined frequency band.

* * * * *

UNITED STATES PATENT AND TRADEMARK OFFICE
CERTIFICATE OF CORRECTION

PATENT NO. : 6,131,035
DATED : October 10, 2000
INVENTOR(S) : Kazuko Ohkubo et al.

It is certified that error appears in the above-identified patent and that said Letters Patent is hereby corrected as shown below:

Title page,
Item [*] Notice, please delete the following:
"Notice: This patent issued on a continued prosecution application filed under 37 CFR 1.53(d), and is subject to the twenty year patent term provisions of 35 U.S.C. 154(a)(2)".

Column 8,
Line 58, change "as set forth in claim 2" to -- as set forth in claim 1 --.

Signed and Sealed this

Eighteenth Day of May, 2004

JON W. DUDAS
*Acting Director of the United States Patent and Trademark Office*